United States Patent [19]

Noll et al.

[11] Patent Number: 4,854,701
[45] Date of Patent: Aug. 8, 1989

[54] ARRANGEMENT FOR INSPECTING LIGHT WAVEGUIDE END FACES

[75] Inventors: Joachim J. Noll, Quickborn; Vladimir Blazek; Hans-Jürgen Schmitt, both of Aachen, all of Fed. Rep. of Germany

[73] Assignee: U.S. Philips Corp., New York, N.Y.

[21] Appl. No.: 135,877

[22] Filed: Dec. 21, 1987

[30] Foreign Application Priority Data

Dec. 20, 1986 [DE] Fed. Rep. of Germany ....... 3643694

[51] Int. Cl.$^4$ ...................... G01N 21/88; G01B 11/27
[52] U.S. Cl. .................................... 356/73.1; 356/359
[58] Field of Search ...................... 356/73.1, 352, 359, 356/371

[56] References Cited

U.S. PATENT DOCUMENTS

| 4,474,469 | 10/1984 | Abe .................................. 356/73.1 X |
| 4,558,950 | 12/1985 | Ulrich et al. ..................... 356/352 X |
| 4,652,123 | 3/1987 | Neumann ............................ 356/73.1 |
| 4,660,972 | 4/1987 | Rossberg et al. .................. 356/73.1 |

FOREIGN PATENT DOCUMENTS

| 3405711 | 8/1985 | Fed. Rep. of Germany . |
| 59-74520 | 4/1984 | Japan ................................. 356/73.1 |

OTHER PUBLICATIONS

Gordon et al., "Fiber-Break Testing by Interferometry: a Comparison of Two Breaking Methods", Applied Optics, vol. 16, #4, Apr. 1977, pp. 818-819.

Primary Examiner—Vincent P. McGraw
Attorney, Agent, or Firm—Ernestine C. Bartlett

[57] ABSTRACT

The invention relates to an arrangement of inspecting light waveguide end faces by observing the interference pattern formed by means of measuring light in the airgap between a plane transparent plate and the end face of a light waveguide abutting on said plate. A less elaborate measuring device requiring less space is obtained in that the measuring light is led towards the end faces to be observed, via the light waveguides (1, 2, 23, 24).

19 Claims, 1 Drawing Sheet

ARRANGEMENT FOR INSPECTING LIGHT WAVEGUIDE END FACES

FIELD OF THE INVENTION

The invention relates to an arrangement for inspecting light waveguide end faces by observing the interference pattern formed by means of measuring light in the airgap between a plane transparent plate and the end face of a light wavegude abutting on said plate.

BACKGROUND OF THE INVENTION

In a method of this type known from Applied Optics, Volume 16, 1977 pages 818-819 the measuring light is directed on to the end faces of a light waveguide via an elaborate bulk-optical system.

SUMMARY OF THE INVENTION

It is an object of the invention to simplify the arrangement for inspecting light waveguide end faces in the opening paragraph in such a manner that a less elaborate measuring device occupying less space is required.

This object is solved in that the measuring light is led towards the end faces to be observed via the light waveguides.

The arrangement according to the invention does not require bulky components for an optical system for illuminating the end faces. Yet the brightness of the illumination on the end faces of each light waveguide to be inspected is limited so that faulty end faces, particularly those which do not extend orthogonally to the axis, can even be discriminated with the naked eye. Since the required components require little space an integrated use with a splicer for connecting two light wave guides is possible.

The other end of a light waveguide need not be accessible if the measuring light is coupled into the light waveguide by means of coupling in a curved section.

A preferred embodiment is characterized in that curved sections of at least two light waveguides into which light is coupled by means of a single light transmitter are juxtaposed. This embodiment is particularly preferred if the end faces of two light waveguides to be connected are to be observed before establishing the connection.

The arrangement according to the invention is preferred for use in combination with a splicer in which the end faces can be observed by means of an observation device integrated in the light waveguide splicer.

A very advantageous and easy to handle embodiment is characaterized in that the observation device consists of a transparent measuring block which has plane-parallel end surfaces and is arranged between the end faces of the light waveguides, which surfaces abut on the light waveguide end faces, and in that each time one of the two formed interference patterns is reflected on a common observation point via reflecting surfaces which are inclined at an angle of approximately 45° with respect to the end surfaces of the measuring block. This embodiment provides the further possibility of observing the interference patterns by means of the observation device used for inspecting the geometrical positions of the light waveguides.

It is alternatively possible to supplement an arrangement according to the invention with a splicer. This requires only few extra components if the interference patterns are imaged on a common observation point via a pivotable deflecting mirror arranged in a first position and if the geometrical positions of the light waveguides are imaged on the common observation points via said mirror arranged in a second position.

However, it is alternatively possible that the interference patterns and the geometrical coupling positions of the light waveguides are imaged on the same image plane by means of a semitransparent reflecting surface and that either the locations of the interference patterns or the coupling positions of the light waveguides are illuminated.

BRIEF DESCRIPTION OF THE DRAWINGS

The invention will now be described in greater detail by way of example with reference to the accompanying drawings in which.

p The essential components of the arrangement according to the invention are only shown diagrammatically and are not to scale.

DETAILED DESCRIPTION OF PREFERRED EMBODIMENTS

Figure 1:
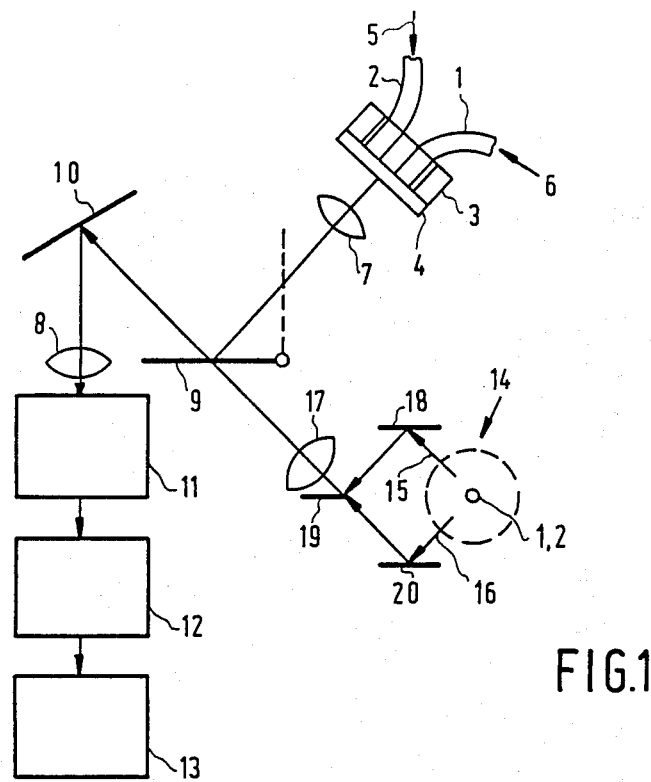
FIG. 1 shows a first arrangement according to the invention in conjunction with a splicer

In FIG. 1 the light waveguides 1 and 2 abut on the transparent plate 4 through capillary ducts of a mount 3. Measuring light introduced in the direction of the arrows 5 and 6 forms interference patterns in the narrow airgaps between the light waveguides 1 and 2 and the plate 4 which patterns are imaged via the optical systems 7 and 8 and the deflection mirrors 9 and 10 on the lightsensitive surface of a video camera 11.

An electronic evaluation system 12 evaluates the picture signals which are finally displayed on a monitor 13. If the end faces are considered to have a good quality, the light waveguides 1 and 2 are removed from the mount 3 and clamped on the manipulators (not shown) of a splicer 14. The geometrical alignment of the ends of the light waveguides 1 and 2 in the splicer can also be observed by means of the video camera 11 via the optical system 17 and the mirrors 18, 19 and 20 in two perpendicular directions 15 and 16 after pivoting the mirror 9 to the position shown in broken lines.

Figure 2:
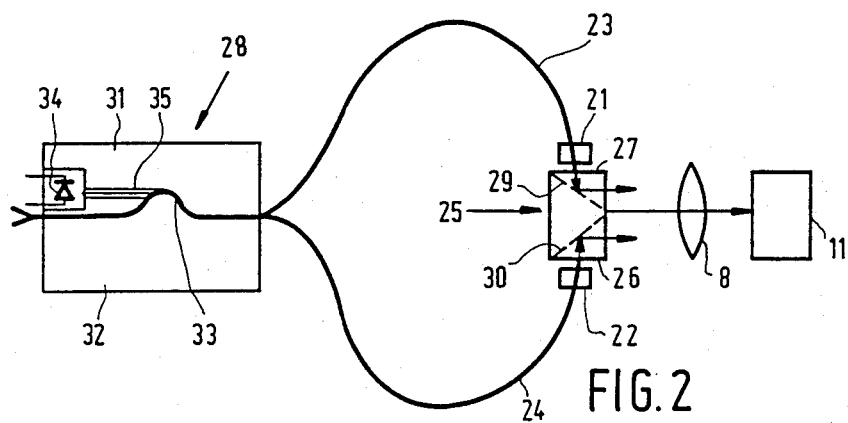
FIG. 2 shows a second arrangement advantageously integrated in a splicer.

The measuring device shown in FIG. 2 may be integrated without occupying too much space in a splicer of the type known from EP-A1 No. 63 954, of which only the manipulators 21 and 22 are shown by which the ends of the light waveguides 23 and 24 can be moved to realize their co-axial alignment.

Before the end faces of the light waveguides 23 and 24 are coupled for the purpose of splicing, a measuring block 25 is pivoted between them, which block has plane-parallel surfaces 26 and 27 engaging the end faces of the light waveguides 23 and 24, respectively. In the airgaps thus formed interference patterns are generated by the measuring light coupled into the two light waveguides via the tandem coupler 28, which patterns are imaged on the video camera 11 via the reflecting surfaces 29 and 30 in the measuring block 25 and the optical system 8.

The tandem coupler 28 comprises two mating bending members 31 and 32 arranged on top of each other. The upper bending member 31 urges the two light waveguides 23 and 24 into a groove having a curved section 33 in the lower bending member 32. At the location of the curved section 33 the light transmitter 34 couples light into the two light waveguides 23 and 24 via the light channel 35. The tandem coupler 28 may advantageously form part of a uniform compact measuring and splicing device.

The quality of the end faces of the light waveguides can be inspected before splicing without the use of many extra components. Light waveguides having faulty end faces can be sorted out or processed again before splicing, thus excluding the risk of increased attenuation caused by discovery of faulty end faces after splicing.

What is claimed is:

1. An arrangement for inspecting light waveguide end faces by observing the interference pattern formed by means of measuring light in the airgap between a plane transparent plate and the end face of a light waveguide abutting on said plate, wherein the measuring light is led towards the end faces to be observed via the light waveguides (1, 2, 23, 24).

2. An arrangement as claimed in claim 1, wherein that the measuring light is coupled into the light waveguide (23, 24) by means of coupling in a curved section (33).

3. An arrangement as claimed in claim 2, wherein curved sections of at least two light waveguides (23 and 24) into which light is coupled by means of a single light transmitter (34), are juxtaposed.

4. An arrangement as claimed in claim 1, wherein the end faces of two light waveguides (1, 2, and 23, 24) to be connected are put into a holding device, in such a way that both end faces are observable before establishing the connection.

5. An arrangement as claimed in claim 4, wherein an observation device for observing the end faces is integrated in the light waveguide splicer (14).

6. An arrangement as claimed in claim 1, wherein the interference patterns are observable by means of an observation device for inspection of the geometrical positions of the light waveguides (1, 2 and 23, 24).

7. An arrangement as claimed in claim 5 containing a pivotable deflecting mirror (9) whereby when the mirror is arranged in a first position via said mirror, and, when arranged in a second position, the geometrical positions of the light waveguides (1,2) are imaged.

8. An arrangement as claimed in claim 5, wherein the interference patterns and the geometrical coupling positions of the light waveguides (23, 24) are imaged on the same image plane by means of a semi-transparent reflecting surface and in that either the locations of the interference patterns or the coupling positions of the light waveguides are illuminated.

9. An arrangement for inspecting light waveguide end faces by observing the interference pattern formed by means of measuring light in the air gap between a plane transparent plate and the end face of a light waveguide abutting on said plate, the end faces of two light waveguides to be connected being in a holding device in such a way that both end faces are observable before establishing the connection and wherein an observation device for observing the end faces is integrated into a light waveguide splicer, said observation device comprising a transparent measuring block which has plane-parallel end surfaces that abut on the end faces of the waveguides and wherein one of two formed interference patterns is reflected on a common observation point via reflecting surfaces which are inclined at an angle of approximately 45° with respect to the end surfaces of the measuring block.

10. An arrangement for inspecting light waveguide end faces by observing the interference pattern formed by means of measuring light in the air gap between a plane transparent plate and the end face of a light wave guide abutting on said plate, wherein the measuring light is led towards the end faces to be observed via the ligth waveguides, the arrangement comprising juxtaposed light waveguides abutting on a transparent plate and each receiving measuring light, the interference patterns being imaged via at least two optical systems and at least two deflection mirrors onto the surface of an observation point.

11. An arrangement as claimed in claim 10 wherein the light waveguides are removed from the plate and mounted on a splicer, the geometrical alignment of the ends of the light waveguides in the splicer being imaged via reflection mirrors and at least two optical systems onto the surface of an observation point.

12. An arrangement as claimed in claim 10 or 11 wherein the interference patterns and the geometrical alignment of the ends of the light waveguides, respectively, are imaged onto the light sensitive surface of a video camera after which the images are evaluated by an electronic evaluation system and displayed on a monitor.

13. An arrangement as claimed in claim 10 or 11 wherein one of the deflection mirrors is a pivotable deflecting mirror whereby when the mirror is arranged in a first position the interence patterns are imaged on a common observation point via said mirror, and, when arranged in a second position, the geometrical positions of the light waveguides are imaged.

14. An arrangement for inspecting light waveguide end faces by observing the interference pattern formed by means of measuring light in the air gaps between a plane transparent plate and the end face of a light waveguide abutting on said plate, wherein the measuring light is led towards the end faces to be observed via the light waveguides, and wherein the observation device comprises a transparent measuring block which has plane-parallel end surfaces and is arranged between the end faces of the light waveguides, which surfaces abut on the end faces of the light waveguides, the interference patterns being reflected on a common observation point via reflecting surfaces which are inclined at an angle of approximately 45° with respect to the end surfaces of the measuring block.

15. An arrangement as claimed in claim 14 wherein the measuring light is coupled into the light waveguide by means of coupling in a curved section.

16. An arrangement as claimed in claim 15 wherein curved sections of at least two light waveguides into which light is coupled by means of a single light transmitter are juxtaposed.

17. An arrangement as claimed in claim 15 wherein the end faces of two light waveguides to be connected are put into a holding device in such a way that both end faces are observable before establishing the connection.

18. An arrangement as claimed in claim 14 in which the observation device for observing the end faces is integrated in a light wave splicer.

19. An arrangement as claimed in claim 14 wherein the interference between and the geometrical coupling positions of the light waveguides are imaged on the same image plane by means of a semi-transparent reflecting surface and wherein either the locations of the interference patterns or the coupling positions of the light waveguides are illuminated.

* * * * *